B. S. McCLELLAN.
JOURNAL BEARING AND COMPRESSOR PROVIDED THEREWITH.
APPLICATION FILED NOV. 25, 1918.
1,320,703. Patented Nov. 4, 1919.
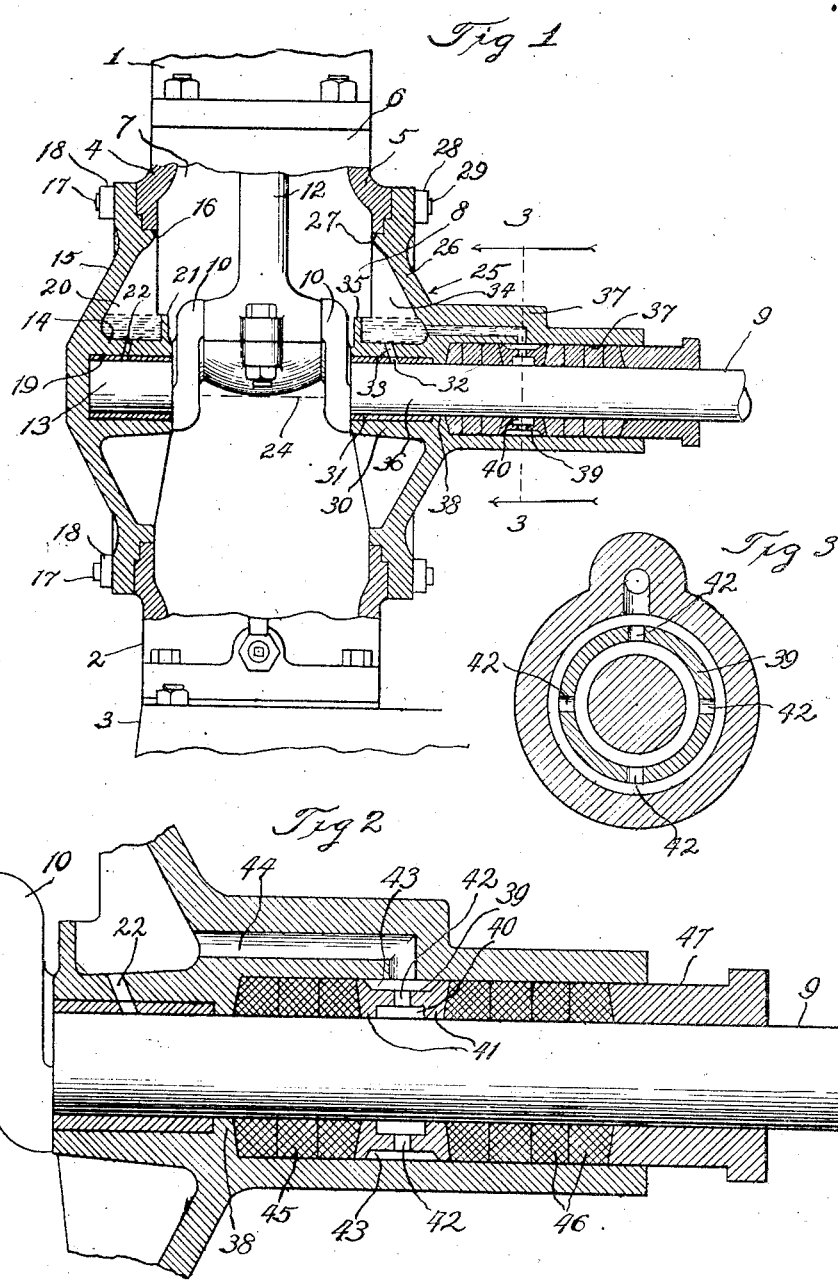
Witness
David N. Fletcher
Inventor
Benjamin S. McClellan
By Harry Irwin Cramer
His Attorney

UNITED STATES PATENT OFFICE.

BENJAMIN S. McCLELLAN, OF CHICAGO, ILLINOIS.

JOURNAL-BEARING AND COMPRESSOR PROVIDED THEREWITH.

1,320,703.   Specification of Letters Patent.   Patented Nov. 4, 1919.

Application filed November 25, 1918. Serial No. 263,976.

*To all whom it may concern:*

Be it known that I, BENJAMIN S. McCLELLAN, a citizen of the United States, residing in Chicago, in the county of Cook and State of Illinois, have invented certain new and useful Improvements in Journal-Bearings and Compressors Provided Therewith, of which the following is a specification.

This invention relates to journal bearings which are adapted to be lubricated, and which are provided with means for preventing the escape of ammonia or a volatile or compressible fluid from a crank casing or chamber of a compressor or device in connection with which such bearings are to be used.

The principal object of the invention is to provide a simple, economical and efficient journal bearing adapted to be lubricated in an efficient manner and adapted to form a support for a shaft or journal,—such, for instance, as the crank-shaft of a compressor having a crank chamber or casing containing ammonia or volatile or compressible fluid,—and provided with means for retaining or preventing the escape of such fluid without tightening the bearing or packing so as to cause unnecessary or avoidable friction.

Other and further objects of the invention will appear from an examination of the following description and claims, and from an inspection of the accompanying drawings which are made a part of this specification.

The invention consists in the features, combinations, details of construction and parts herein described and claimed.

In the accompanying drawings, Figure 1 is a view in central vertical section of a crank casing and journal bearing mechanism of a compressor, constructed in accordance with my invention and improvements, with the piston mechanism, piston cylinder or compression chamber, and other parts of the compressor broken away or omitted, and with parts of the compressor shown in elevation.

Fig. 2, an enlarged detail view in central vertical section, of my improved journal bearing, showing the same with a crank shaft journaled therein, with parts broken away; and Fig. 3, a view in transverse vertical section, taken on line 3, 3, of Fig. 1, looking in the direction indicated by the arrows, and showing in section the separator ring which is interposed between the journal or shaft and the body of the packing box, and in contact with the packing.

In constructing a compressor provided with a crank casing or chamber and journal bearing mechanism made in accordance with my invention and improvements, I provide a compressor 1 having a main frame 2 and a base 3, and piston mechanism and a piston cylinder or compression chamber having ammonia inlet and outlet passages or conduits adapted to communicate with compression and expansion and refrigerating coils of a refrigerating apparatus, all of which may be of any desired ordinary and well known form, and which it is therefore deemed unnecessary and undesirable to describe in detail herein.

The compressor is provided with a crank case having end walls 4 and 5, and side walls 6 and 7 all forming a crank chamber or crank and piston chamber 8 into or through which extends a crank shaft 9. The crank shaft has crank arms 10 which are located in the crank chamber or casing, and are connected by means of a wrist pin 11. A pitman 12 is operatively connected at its bottom extremity with the wrist pin in any desired suitable or ordinary and well known manner, and is connected at its upper end with a piston—not shown—for compressing ammonia or volatile refrigerating fluid in the piston cylinder or compression chamber of the compressor.

The crank shaft 9 has an end journal portion 13 journaled in a journal bearing member 14 which has an annular flange or plate 15 mounted in or forming a part of the end wall 4 of the crank casing. This journal bearing member comprising the parts 14 and 15, serves to entirely close the opening in the end wall 4 of the crank chamber, and is secured in position by means of bolts 17 and nuts 18 or similar suitable securing means.

A suitable lining or bushing 19, which may be made of Babbitt or other suitable material is interposed between the journal 13 and the annular sleeve or bearing portion 14; and an oil receptacle or pocket is formed in the inner side of the bearing member 15 and over the part 14. This oil receptacle or pocket 20 has an upright inner side wall 21; and the bottom of the pocket is formed by the part 14, already described. An oil hole 22 in the sleeve portion 14 communicates with a similar opening 23 in the Babbitt metal sleeve or bushing 19 and is adapted to conduct lubricating oil through the latter and into position to lubricate the journal 13 and its bearing. The mouth of the oil pocket 20 is open in the direction of the interior of the crank chamber and is in position adjacent to the crank 21, so as to receive lubricating oil carried up from the lower portion of the crank containing chamber by the crank and pitman mechanism. The crank chamber is filled with oil up to a point which will cause the crank to extend into the oil during at least a part of each revolution of the crank shaft. The crank chamber is, by preference, filled with lubricating oil up to approximately the level of the axial center of the crank shaft. The normal position of the top surface of the oil is indicated by the broken line 24 in Fig. 1.

My improved journal bearing 25 is constructed as follows: A bearing head or plate 26, which is, by preference, in the form of an annular or circular flange, plate or head, is mounted in position to close the opening 27 in the end wall 5 of the crank chamber or casing. The bearing head or plate 26 is secured in position by means of bolts 28 and nuts 29, or by similar suitable securing means, and is provided with a central hollow bearing box or sleeve portion 30 in which is mounted a Babbitt metal bushing or bearing sleeve 31 having an oil opening 32 in its upper side which communicates with an oil passage 33, in the bearing box or hollow inner journal bearing part 30. The part 30 forms the bottom of an oil pocket or receptacle 34 which is formed in the inner side of the bearing head or plate 26 directly over the central hollow journal bearing box or sleeve 30. This oil pocket or reservoir 34 has an inner side wall 35 which is adjacent to the corresponding crank arm 10, and of such a height as to enable lubricating oil carried up by the crank and pitman mechanism to be thrown, splashed or caused to pass into the oil pocket or oil reservoir 34, for lubricating the journal 36 of the shaft 9, and its journal bearing.

The journal bearing head 26 is provided with a hollow outwardly projecting packing box or stuffing box 37 integral with the part 26 and having an axial bore which encircles the shaft 9, said shaft, when journaled in the central hollow journal box or part 30, being concentric with the bore. An inner annular flange 38 encircles the journal 36 of the shaft 9 and is located between the inner hollow bearing box part 30 and babbitt bushing or bearing sleeve 31 and the relatively large axial bore 37' of packing box 37.

A ring 39, which is made, by preference, of metal, is interposed between the shaft 9 and the inner wall of the pacing box 37. The inner diameter of this ring is such that it fits in sliding engagement with and is adapted to permit the rotation of the shaft 9, which it encircles; and the ring is provided with an inner annular oil space which is, by preference, in the form of an annular grove 40 located between opposite, preferably connected or integral inner flange or ring portions 41, 41. The ring is also provided with a suitable number of apertures or passages 42 each of which leads outward radially from the inner annular oil groove 40, and communicates with an outer annular or peripheral groove 42, which, in turn, communicates with an oil supply passage 44 in the packing box wall. This passage 44 communicates at one extremity, with the oil reservoir or pocket 34, and at its opposite extremity, with the upper part or top of the grooved portion of the separating ring 39. Interposed between the ring 39 and the inner annular flange 38 is a suitable packing, preferably in the form of a packing ring or rings 45 of compressible packing material, such, for instance, as what is commonly known as asbestos packing. Similar packing material, which may be in the form of packing rings 46 of compressible packing material, is mounted in the packing box 37 in position to encircle the shaft 9 between the ring 39 and the outer extremity of the packing box, where a packing gland or similar retaining device is mounted in position to encircle the shaft and engage the packing material or rings of compressible packing material 46, and to press and hold the rings of compressible packing material in tight engagement with the ring 39, both sides of which are thus adapted to be held in tight snugly fitting engagement with compressible packing material located on opposite sides of said ring.

The gland 47 may be of any desired ordinary and well known form of packing gland, and is adapted to be pressed into and held in operative position by any desired ordinary and well known means, such, for instance, as an ordinary cap or cap nut which may be of any desired ordinary and well known form, and is, therefore not shown, or by similar or equivalent ordinary and well known securing means mounted in position to engage and press the gland inward.

It is well known to those skilled in the art to which this invention relates that ammonia or volatile refrigerating fluid in gaseous form escapes from the piston chamber or compressor chamber into the crank casing of the compressor, when such compressor, forming a part of a refrigerator system, is in operation, and that great difficulty is experienced, and it has in fact been found to be practically impossible by use of any means known to the art or in use, to prevent the escape of volatile fluid or ammonia from the crank casing or chamber while a compressor is in operation, without tightening the packing around the crank shaft so tight as to cause undue friction and interfere with the rotation of the shaft in its bearings.

My improved journal bearing, when constructed as above described, is adapted to cause an annular film or ring of lubricating oil to form in the annular groove 40 in the separator ring 39, and also in the outer annular groove 43 in said ring. The oil in the inner groove being in contact with and in position to encircle the shaft, and the oil in the outer groove being in contact with the inner surface of the packing box 37, and the oil in both grooves, as well as any other liquid contained in said grooves being free to pass from one to the other of the grooves, and the grooves being connected by the intervening passage 42, and in position to receive oil from the passage 44 and to permit the escape of ammonia gas or volatile fluid, which is lighter than oil, from said grooves into the passage 44, so as to return through said passage into the crank casing or chamber, it is plain that any ammonia or volatile fluid which may reach or enter either of the oil grooves 40 or 43 will there rise through the oil and pass upward into the passage 44 and into the crank casing, and will thus be retained in the crank casing or chamber and prevented from passing out along with the lubricating oil. The returning of the ammonia or volatile refrigerating fluid to the crank chamber or casing is thus accomplished in a simple and efficient manner and without the necessity of tightening the packing to such an extent as to interfere with the rotation of the shaft or to cause unnecessary or avoidable friction.

The ring 39, with its inner and outer circumferential channels or annular grooves filled with lubricating oil forms a liquid seal. The oil-filled channels 40 and 43 are adapted to communicate with and to permit the passage of ammonia or volatile fluid into the passage 44 and through said passage into the oil receptacle or reservoir 34 and into the crank casing or chamber 8 which contains ammonia or volatile refrigerating fluid under pressure when the apparatus is in operation. The passage 44 thus forms a vent or return passage for permitting any ammonia which may reach the ring 39 or the oil-containing channels 40 and 43, or either of them, to pass upward through the oil and through said passage 44 to the crank chamber 8, in whatever position the ring 39 may happen to be placed so long as the channel 43 is in position to communicate with the passage 44. In other words, the ring may be turned upon its axis to any extent while being placed in position, or may be accidentally partially rotated after being placed in operative position without shutting off the communication between the inner oil channel 40 and the passage 44; and the ring being in snug engagement with the packing and with the oil channels adapted to communicate with the passage 44, co-acts with the passage 44 and oil reservoir 34 and with the packing in trapping or separating the ammonia or compressible refrigerating fluid from the lubricating oil, and in preventing the escape of ammonia.

I prefer to make the ring 39 in one piece rather than to make it in a plurality of pieces or in sections or in the form of a split ring; and I prefer to have the ring located between rings of packing material rather than to omit the rings 45 which are located between the ring and the inner flange or bearing part 38. I also prefer to have the walls of the channels 40 and 43 formed on both sides of the channels by ring portions rather than to have one wall of the channel formed by a part of the box body or by a separate packing ring mounted in position to provide an oil channel between such packing ring and the metallic ring. The annular channels 40 and 43 thus form an oil-sealed chamber, and said channels, together with the passage 44, form an oil-sealed conduit which communicates with the oil chamber 34 and with the interior of the crank case, acting to conduct compressible fluid through the oil to the interior of the oil chamber 34 and the crank case, as already suggested.

I claim:

1. In a device of the class described, a journal bearing adapted to support a crank shaft in position to extend into a crank casing containing compressible fluid, an oil chamber located in position to communicate with the interior of the crank casing and adapted to contain oil for lubricating the journal bearing, means forming an annular oil channel adapted to encircle the shaft, for holding oil in contact with the surface of the shaft throughout its entire circumference, means for holding packing material in position to encircle and engage the periphery of the shaft outside of the annular oil channel, and a passage communicating with the annular oil channel and adapted to communicate with the interior of the crank casing and acting to conduct compressible fluid under pressure from said annular oil channel to the interior of the crank casing.

2. In a device of the class described, a journal bearing adapted to support a crank shaft in position to extend into a crank casing forming a compressible-fluid-containing chamber, an oil chamber located in position to communicate with the interior of the compressible-fluid-containing chamber and adapted to contain oil for lubricating the journal bearing, a ring mounted in position to encircle the shaft and forming an annular oil channel adapted to hold oil in contact with the surface of the shaft throughout its entire circumference, means for holding packing in position to engage the periphery of the shaft outside of the annular oil channel formed by said ring, and a passage communicating with the annular oil channel and with the interior of the compressible-fluid-containing chamber, for conducting compressible fluid under pressure from the annular oil channel to the interior of said compressible-fluid-containing chamber.

3. In a device of the class described, a journal bearing adapted to support a crank shaft in position to extend into a casing provided with a chamber containing compressible fluid, an oil chamber located in position to communicate with the interior of such compressible-fluid-containing chamber, means forming an annular oil channel adapted to encircle the shaft for holding oil in contact with the surface of the shaft throughout its entire circumference, a packing box, means for holding packing material in the packing box in position to encircle and engage the periphery of the shaft outside of the annular oil channel, and an oil passage leading from said oil chamber to said annular oil channel and forming an oil-sealed conduit adapted to conduct compressible fluid through oil contained in said passage to the interior of said oil chamber.

4. In a device of the class described, a journal bearing adapted to support a crank shaft in position to extend into a casing provided with a chamber containing compressible fluid, a packing box, a ring mounted in the packing box in position to encircle the shaft and provided with an annular oil channel adapted to hold oil in contact with the shaft, an outer annular oil channel in said ring, means affording communication between said annular oil channels, an oil chamber located in position to communicate with the interior of said compressible-fluid-containing chamber, and provided with an oil passage leading from said oil chamber to said outer annular oil channel, said passage and annular channels forming an oil-sealed conduit adapted to conduct compressible fluid from the oil-containing annular passages into said oil chamber, and means for holding packing material in the packing box in position to encircle the shaft on the outside of and in contact with said ring.

5. In a device of the class described, the combination of, a compressor having a crank casing forming a chamber adapted to contain compressible fluid under pressure, a journal bearing secured to the casing and adapted to support a crank shaft in position to extend into the compressible-fluid-containing chamber, an oil chamber located in position to communicate with the interior of the compressible-fluid-containing chamber, a packing box, a ring mounted in the packing box and provided with an oil channel adapted to encircle the shaft for holding oil in contact with the surface of the shaft throughout its entire circumference, an oil passage leading from said first mentioned oil chamber to said shaft-encircling channel, said passage and channel forming an oil-sealed conduit adapted to conduct compressible fluid from the shaft-encircling channel to the compressible-fluid-containing chamber formed by the crank case, and means for holding packing material in the packing box in position to encircle the shaft and in contact with said ring.

Signed at Chicago, Illinois, this 21st day of November, 1918.

BENJAMIN S. McCLELLAN.

Witnesses:
DAVID H. FLETCHER,
HARRY I. CROMER.